United States Patent [19]
Shafer

[11] 3,824,901
[45] July 23, 1974

[54] SPRING RETURN FOR PISTON OPERATOR

[75] Inventor: Jon L. Shafer, Mansfield, Ohio

[73] Assignee: Shafer Valve Company, Mansfield, Ohio

[22] Filed: Jan. 18, 1973

[21] Appl. No.: 324,900

[52] U.S. Cl. ............... 92/13.6, 92/128, 92/130, 92/138, 92/152
[51] Int. Cl. ............... F01b 7/00, F01b 31/00
[58] Field of Search ............ 92/138, 130, 13.6, 152

[56] References Cited
UNITED STATES PATENTS

| 742,290 | 10/1903 | Clark | 92/130 |
| 1,548,394 | 8/1925 | Sumner | 92/130 |
| 3,614,913 | 10/1971 | Clark | 92/138 |
| 3,709,106 | 1/1973 | Shafer | 92/138 |
| 3,727,523 | 4/1973 | Gulick | 92/130 |

*Primary Examiner*—Paul E. Maslousky
*Attorney, Agent, or Firm*—Hamilton, Renner & Kenner

[57] ABSTRACT

A spring return unit for actuating in one direction a linear piston operator which is actuated in the opposite direction by fluid pressure, said spring return being removably attachable to one end of the operator and comprising a fully enclosed pre-loaded compression spring compressible by an extension element on the end of the operator.

8 Claims, 4 Drawing Figures

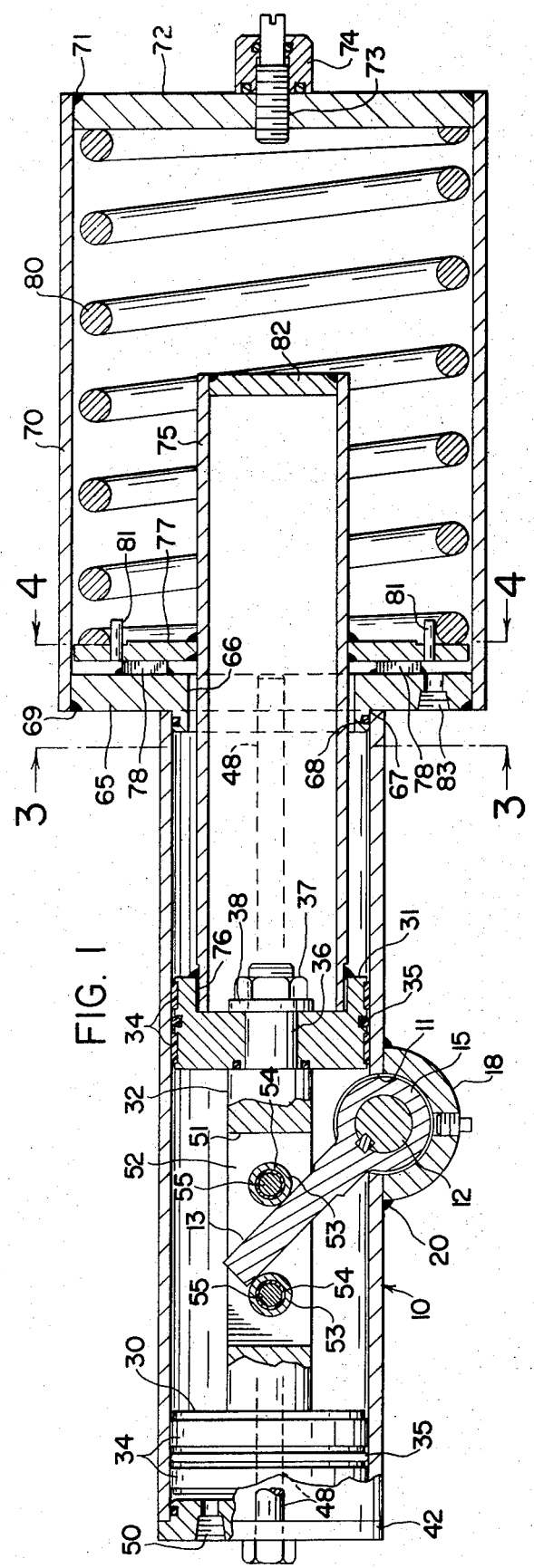
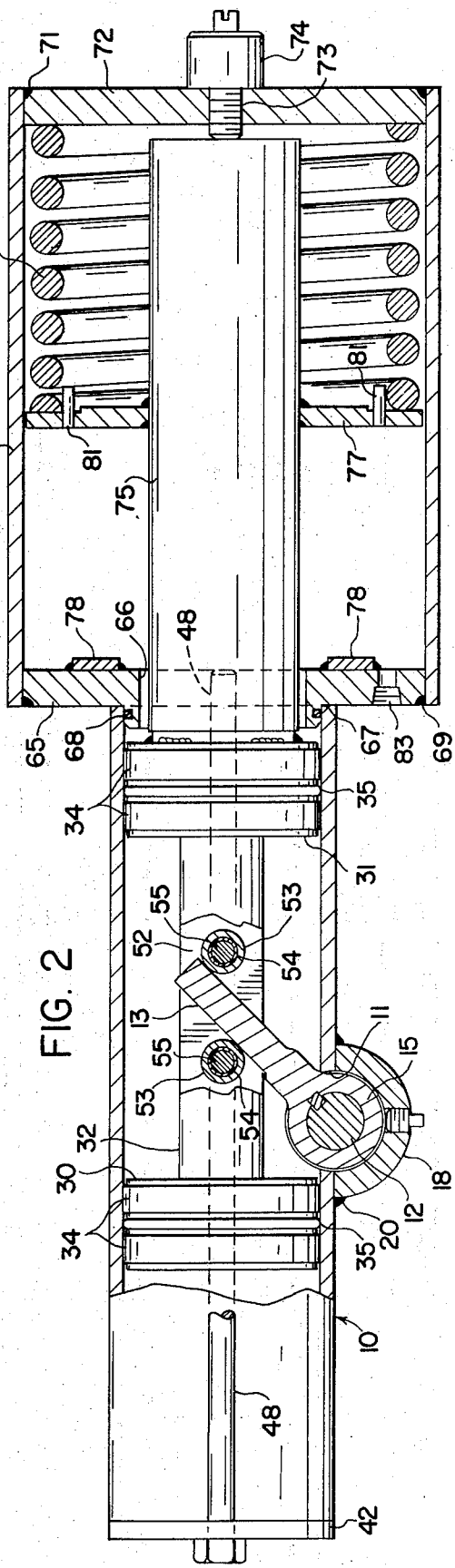

SPRING RETURN FOR PISTON OPERATOR

BACKGROUND OF THE INVENTION

In the application of Homer J. Shafer, Ser. No. 72,018, allowed July 31, 1972, now U.S. Pat. No. 3,709,106, there is disclosed a linear piston operator for a rotary valve, said operator having dual pistons actuated in opposite directions by fluid pressure and having means operatively connected to said piston operator for imparting rotary movement to the valve stem of the rotary valve. However, in the event of failure of the fluid pressure the valve may fail to close or fail to remain in closed position, thus causing a serious unsafe condition.

SUMMARY OF THE INVENTION

It is an object of the present invention to provide an improved pre-loaded spring return unit for ready attachment to a linear piston operator, which unit is fully loaded by fluid pressure actuation of the operator in one direction and adapted to return the operator in the opposite direction when fluid pressure actuation in said one direction is relieved.

Another object is to provide an improved spring return unit which is adapted to be easily connected to either end of a linear fluid pressure piston operator and requires a minimum of space.

A further object is to provide an improved spring return unit which is completely enclosed so as to be safe, leakproof and tamper-proof at all times, including disassembly of the operator.

Another object is to provide an improved spring return unit which can be used to operate in one direction in conjunction with fluid pressure operation in both directions, and can be used to store fluid pressure to insure failsafe operation.

A still further object is to provide an improved spring return unit in which the amount of spring compression is easily adjustable without increasing the length of the unit.

These and other objects are accomplished by the improvements comprising the present invention, a preferred embodiment of which is shown by way of example in the accompanying drawings, and hereinafter described in detail. Various modifications and changes in details of construction are intended within the scope of the appended claims.

DESCRIPTION OF THE DRAWINGS

FIG. 1 is a longitudinal sectional view, partly in elevation, of a linear piston operator having the improved spring return mounted on one end, and showing the pistons in the returned position as actuated by the spring.

FIG. 2 is a similar view, showing the pistons actuated in the opposite direction to further compress the spring.

DESCRIPTION OF A PREFERRED EMBODIMENT

Figure 3:
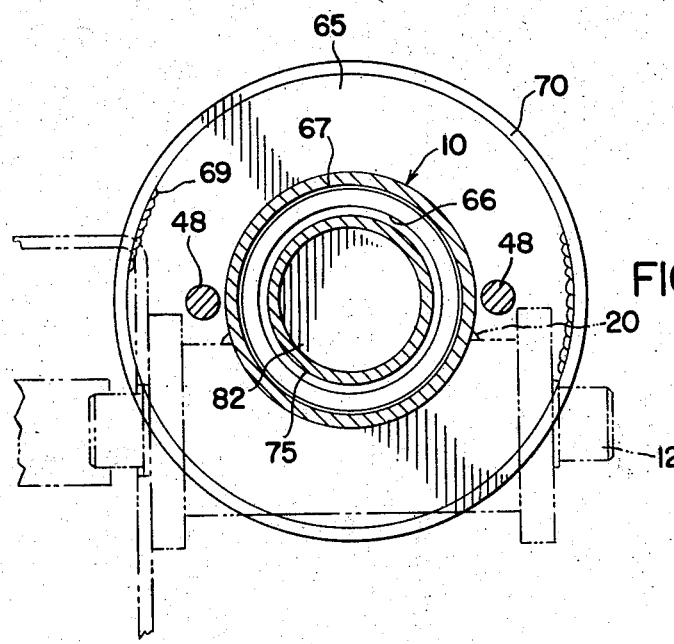
FIG. 3 is a cross-sectional view on line 3—3 of FIG. 1.
Figure 4:
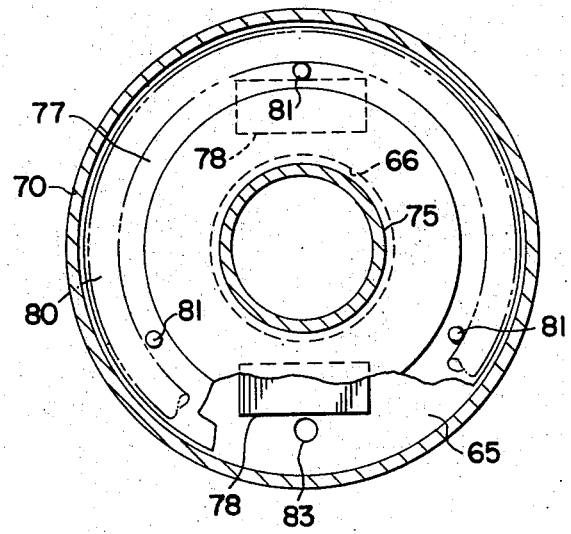
FIG. 4 is a cross-sectional view on line 4—4 of FIG. 1.

The linear piston operator is generally similar to that disclosed and described in said application Ser. No. 72,018, and comprises a cylindrical housing 10 having a transverse notch 11 midway of its ends in one side of the cylinder, with the valve stem 12 of a rotary valve (not shown) extending through the notch. A crank arm 13 extends into the cylinder and is welded to a collar 15 encircling the stem and keyed thereto at 16.

On opposite sides of the collar 15, the valve stem 12 is journaled in transverse cylindrical housing 18 which covers over the notch 11 and has its inside wall cut out and shaped to the walls of the cylinder adjacent to the notch, so that a continuous weld 20 may secure housing 18 around the ends and along the side edges of the notch to form a sealed enclosure for the valve stem and its bearings.

Within the cylinder are two pistons 30 and 31 connected in spaced relation by a bar 32 and slidably mounted in the cylinder on opposite sides of the notch 11. Preferably, the outer periphery of each piston has two Teflon bearing bands 34 with an O-ring seal 35 between the bands. The connecting bar 32 has cylindrical necks 36 at each end upon which the pistons 30 and 31 are mounted, and nuts 37 are screwed on the ends of necks 36 to clamp the pistons between washers 38 and shoulders on the necks 36 of the connecting bar.

The connecting bar 32 has a central slot 51 receiving the free end of the crank arm 13 and formed by side portions 52 straddling the crank arm. A pair of rollers extend transversely of the slot, one on each side of the crank arm, said rollers preferably having hardened steel outer bushings 53 with inner bearing sleeves 54 journaled on pins 55 having their outer ends secured in side portions 52. Thus, linear movement in opposite directions of the pistons 30 and 31 with the connecting bar will impart rotary motion in opposite directions to the valve stem 12.

The parts thus far described are described in greater detail in said copending application Ser. No. 72,018, and per se form no part of the present invention.

The head or end plate 42 at one end of the cylinder housing 10 may have diametrically opposite ear flanges projecting radially of the cylinder to receive the ends of tie bolts 48 secured at their other ends to end plate 65 for drawing the end plates tightly against the ends of cylinder 10. This end plate 65 replaces an end plate like 42 which would be used when no spring return is desired as shown and when both end plates have ports 50 for alternating supplying and exhausting fluid pressure to reciprocate the pistons and rotate the valve stem between open and closed positions.

When it is desired to add the improved spring unit, the end plate 65 forming the inner end of the spring housing replaces an end plate like 42 and is attached to the ends of tie bolts 48 to draw the plate against the end of cylinder 10. The end plate 65 has a central circular opening 66, and a circumferential shoulder 67 surrounds the opening and fits tightly within the end of cylinder 10 with an O-ring 68 in the shoulder to seal the joint.

The end plate 65 projects radially beyond the tie bolts 48 and has a circular outer periphery which is welded at 69 to one end of the cylindrical spring housing 70, the other end being welded at 71 to a closure plate 72, which preferably with a sealing end cap 74 screwed on its outer end.

A tubular extension member 75 having an outer diameter which will fit closely within a circular recess 76 on the outer face of piston 31 is welded at its inner end to said piston at the same time as end plate 65 is ttached to tie bolts 48, and extends into the spring housing 70. A spring pressure plate 77 previously welded to the member 75 has an outer diameter fitting within housing 70 with a lateral working clearance. As shown in FIG. 1, the position of the plate 77 on the member 75 is such that when piston 31 is at the end of its stroke to the left, the plate 77 will be at the inner end of housing 70, preferably spaced from end plate 65 by stop plates 78 welded on the inner surface of plate 65.

A strong compression spring 80 is enclosed within housing 70 and has an outer diameter such as to provide a clearance between the spring and housing. The spring may be welded at its outer end to closure plate 72 and held in position at its inner end by centering pins 81. The length of the spring is such that it must be compressed or pre-loaded in order to insert it between closure plate 72 and pressure plate 77. The strength of the spring is determined by he amount of spring pressure required to return the pistons 30 and 31 from the position of FIG. 2 to the position of FIG. 1, with consequent rotation of valve stem 12, when the fluid pressure holding the pistons in the position of FIG. 2 is relieved, while at the same time being fully compressible by the fluid pressure acting on the pistons when they are moved from the position of FIG. 2 to the position of FIG. 1. The length of extension member 75 is designed so that in the position of FIG. 2 its end plate 82 will abut stop stud 73.

End plate 65 is provided with a port 83 in which a pressure control valve may be mounted for controlling the fluid pressure in spring housing 70 and the end of housing 10 communicating therewith if it is desired to store fluid pressure therein to augment the spring return action. Also, port 83 can be used as a supply and exhaust port if it is desired normally to operate the piston in both directions by fluid pressure, and to use the spring to return the pistons from the position of FIG. 2 to that of FIG. 1 in case of fluid pressure failure. Further, the housing 70 is completely sealed and may be used as an oil container for maintaining oil in contact with the spring at all times to insure against corrosion.

It will be seen that an extremely simple and effective spring return unit has been provided which is easily installed on one end of an existing fluid pressure operator merely by operating one end plate of the operator with the inner end plate of the spring housing and welding extension tube 75 to piston 31, an operation quickly and easily performed in the field. Due to the relatively large diameter of the spring housing a minimum of space longitudinally of the operator is required, and different spring return forces as required may be provided by utilizing various diameters of spring wire, thereby requiring a minimum number of parts. The travel of the pistons from the position of FIG. 1 to FIG. 2 is easily adjusted as required by adjustable stop stud 73. The clearances provided between the pressure plate 77 and housing 70 and between the spring and housing insures that there will be no frictional contact with consequent galding of metal surfaces.

Further, the construction of the improved spring return unit is tamper-proof since the spring is totally and permanently enclosed within a welded housing, and is completely safe as it avoids any possibility of injury due to flying parts during attachment or detachment of the unit from the fluid pressure operator.

I claim:

1. In a linear fluid piston operator for a rotary valve having a tubular housing with removable end plates thereon, pistons in opposite ends of the housing, and means operatively connected to said pistons for imparting rotary movement to said valve when the pistons are moved linearly, the improvement comprising a spring return unit having a sealed housing mounted on one of said end plates and communicating with said tubular housing, a pre-loaded compression spring permanently enclosed within said spring housing, and a linear extension element connected to the adjacent piston and extending through said one end plate into said spring housing for compressing said spring as the piston is moved toward said spring housing, said one end plate having port means for controlling fluid pressure in said spring housing.

2. In a linear fluid piston operator as described in claim 1, in which the extension element has a compression plate secured thereon within and having a lateral clearance from the spring housing and abutting one end of said spring.

3. In a linear fluid piston operator as described in claim 1, in which the outer end of said spring housing has a adjustable stop screw for abutting the outer end of said extension unit to limit travel of said adjacent piston in one direction.

4. In a linear fluid piston operator as described in claim 2, in which the outer end of said spring housing has adjustable stop screw for abutting the outer end of said extension unit to limit travel of said adjacent piston in one direction.

5. In a linear fluid piston operator as described in claim 1, in which the end plate on which said sealed housing is interchangeable with said other end plate and has an opening therein through which said extension element extends.

6. In a linear fluid piston operator as described in claim 2, in which the end plate on which said sealed housing is mounted is interchangeable with said other end plate and has an opening therein through which said extension element extends.

7. In a linear fluid piston operator as described in claim 3, in which the end plate on which said sealed housing is mounted is interchangeable with said other end plate and has an opening therein through which said extension element extends.

8. In a linear fluid piston operator as described in claim 4, in which the end plate on which said sealed housing is mounted is interchangeable with said other end plate and has an opening therein through which said extension element extends.

* * * * *

UNITED STATES PATENT OFFICE
CERTIFICATE OF CORRECTION

PATENT NO. : 3,824,901
DATED : July 23, 1974
INVENTOR(S) : Jon L. Shafer

It is certified that error appears in the above-identified patent and that said Letters Patent are hereby corrected as shown below:

Column 2, line 8, after "in" insert --a--; line 64, after "preferably" insert --has an adjustable stop stud 73 screwed into its central portion--.

Column 3, line 2, "ttached" should read --attached--; line 20, "by he" should read --by the--; line 48, "operating" should read --replacing--.

Column 4, line 33, "has a" should read --has an--; line 38, after "has" insert --an --; line 43, before "interchangeable" insert --mounted is--.

Signed and sealed this 15th day of July 1975.

(SEAL)
Attest:

RUTH C. MASON
Attesting Officer

C. MARSHALL DANN
Commissioner of Patents
and Trademarks